Feb. 21, 1967 HISASHI KANEKO 3,305,855

ENCODER AND A DECODER WITH NON-LINEAR QUANTIZATION

Filed Nov. 1, 1963 2 Sheets-Sheet 1

Inventor
HISASHI KANEKO

By

Attorney

Inventor
HISASHI KANEKO
By
Attorney

United States Patent Office 3,305,855

Patented Feb. 21, 1967

3,305,855
ENCODER AND A DECODER WITH NON-LINEAR QUANTIZATION

Hisashi Kaneko, Tokyo, Japan, assignor to Nippon Electric Company, Limited, Tokyo, Japan, a corporation of Japan Filed Nov. 1, 1963, Ser. No. 320,622
Claims priority, application Japan, Nov. 8, 1962, 37/50,370
4 Claims. (Cl. 340—347)

This invention relates to a decoder used in pulse-code modulation (PCM) communication and a digital-analogue converter whereby it is possible to convert digital signals into analogue signals expanded according to an $m$-th order polynomial characteristic, without resorting to the inherent non-linearity of a non-linear circuit element such as a semiconductor device, and consequently relates to a PCM encoder and an analogue-digital converter wherein such a decoder is comprised.

Conversion into digital signals by sampling, quantizing, and encoding analogue signals representing analogue quantities such as voice, picture, data, or others, presents excellent technical merits such as increase in insusceptibility of transmission and handling of the information to noise. Although analogue signals or sampled analogue signals are generally quantized with equal quantization steps, some types of analogue signals such as voice signals in which signals of smaller amplitudes occur frequently as viewed in the light of probability, are preferably quantized with minor quantization steps for signals of smaller amplitudes as compared with quantization steps for signals of larger amplitudes. For such non-linear quantization, analogue signals have been first compressed by an instantaneous compander, in which the inherent non-linearity of non-linear circuit elements such as semiconductor devices or vacuum tubes are utilized, and then quantized linearly. With such non-linear quantization whose characteristic depends on the inherent non-linearity of non-linear circuit elements, it has been impossible to obtain uniform non-linear quantization characteristics because of the temperature dependency and variations of the inherent non-linearities.

As a conventional non-linear encoder wherein the inherent non-linearity of a non-linear circuit element is not resorted to, there is an encoder proposed by B. D. Smith in "Proceedings of the I.R.E.," 1953, pp. 1053–1058 (August), which is of the feedback type and has a hyperbolic characteristic. However, no decoding or encoding device has ever been known that has more generally an $m$-th order polynomial characteristic.

In general, non-linear companding and encoding of $2^n$ quantization levels, where $n$ is the code length of a binary codeword, is possible by $2^n$ power source (or amplifiers or attenuators) having non-linearly different output voltages and a switch group for selecting one of the power sources in compliance with a given analogue signal. The number of necessary components of a non-linear encoder or decoder according to such a principle, however, increases in proportion to $2^n$ with increase of the code length $n$. Thus, the number of the power sources amounts to as many as $2^{10}$ or 1024 in case the code length is 10 bits. Reduction in the number of the components purpose for realizability would restrict the forms of the nin-linear function to result in the abovementioned hyperbolic encoder or the like.

Therefore, the principal object of the invention is to provide a decoder or an encoder having a companding characteristic represented by an $m$-th order polynomial, without any resort to the inherent non-linearity of a non-linear circuit element but with very simple construction.

Another object of the invention is to provide a decoding circuit of the kind which produces at the output an analogue electric power of the $m$-th power of a given digital signal.

Still another object of the invention is to provide an encoder which produces at the output a digital signal corresponding to the $m$-th root (when $m$ is two, the electric power) of a given analogue signal.

Now the principles of the invention will be explained for a case of a binary code.

In general, $y$ which is an $m$-th order polynomial of a variable $i/N$ may be given by $$y=A_0(i/N)^0+A_1(i/N)^1+A_2(i/N)^2+\dots+A_j(i/N)^j+\dots+A_m(i/N)^m \quad (1)$$

where $j$ is an integer and $A_j$ is a coefficient for determining the $m$-th degree function. Normalization of the equation (1) by imposing a boundary condition such that $$\left.\begin{matrix} y=0 \text{ at } i=0 \\ y=1 \text{ at } i=N \end{matrix}\right\} \quad (2)$$

will not result in any loss of the generality. From the equation 1 then another equation $$y=A_1(i/N)^1+A_2(i/N)^2+\dots+A_j(i/N)^j+\dots+A_m(i/N)^m \quad (3)$$

follows. In this equation 3 the first coefficient $A_0$ in the equation 1 becomes zero. The equation 3, may, however, be brought back to the equation 1 when the function $y$ represents an electric quantity, by adjusting the direct-current level because the coefficient $A_0$ then represents the direct current component. The coefficients $A_1$ through $A_m$ inclusive, although denoted by the same symbols as in the equation 1, must satisfy a relation $$A_1+A_2+\dots A_j+\dots+A_m=1 \quad (4)$$

On the other hand, if $i$ is a number corresponding to a quantization level among the quantization levels from 0 to N inclusive, where $N=2$, then $i$ may be represented by an $n$-bit binary codeword $\{e_1, e_2, \dots, e_n\}$ in such a manner that $$i=e_n+e_{n-1}\times 2+e_{n-2}\times 2+\dots+e_k\times 2^{n-k}+\dots+e_1\times 2^{n-1}, \quad (5)$$

where $e_k$ is either 0 or 1.

By substituting the equation 5 into the equation 3

$$y=A_1\cdot N^{-1}\cdot(e_n+e_{n-1}\times 2+\dots+e_k\times 2^{n-k}+\dots+e_1\times 2^{n-1})+A_2\cdot N^{-2}\cdot(e_n+e_{n-1}\times 2+\dots+e_k+2^{n-k}+\dots+e_1\times 2^{n-1})+\dots+A_j\cdot N^{-j}\cdot(e_n+e_{n-1}\times 2+\dots+e_k\times 2^{n-k}+\dots+e_1\times 2^{n-1})^j+\dots+A_m\cdot N^{-m}\cdot(e_n+e_{n-1}\times 2+\dots+e_k\times 2^{n-k}+\dots+e_1\times 2^{n-1})^m \quad (6)$$

or namely $$y=A_1(e_1\times 2^{-1}+\dots+e_k\times 2^{-k}+\dots+e_{n-1}\times 2^{-n+1}+e_n\times 2^{-n})+A_2(e_1\times 2^{-1}+\dots+e_k\times 2^{-k}+\dots+e_{n-1}\times 2^{-n+1}+e_n-2^{-n})^2+\dots+A_j(e_1\times 2^{-1}+\dots+e_k\times 2^{-k}+\dots+e_{n-1}\times 2^{-n+1}+e_n\times 2^{-n})^j+\dots+A_m(e_1\times 2^{-1}+\dots+e_k\times 2^{-k}+\dots+e_{n-1}\times 2^{-n+1}+e_n\times 2^{-n})^m \quad (7)$$

follows. Expansion of the parenthized $j$-th power of the $j$-th term in the equation 7 will result, according to the multinomial expansion theorem, in a homogeneous expression which consists of $j$-th powers of $e_1, e_2, \dots, e_k, \dots$, and $e_n$, and each term of which is a product of $p_1$ in number of the first term, $p_2$ in number of the second term, . . . , $p_k$ in number of the $k$-th term, . . . , and $p_n$ in number of the $n$-th term in the parentheses, namely, a product $$(2^{-1}e_1)^{p_1}.(2^{-2}e_2)^{p_2}. \ldots .(2^{-k}e_k)^{p_k}. \ldots (2^{-n}e_n)^{p_n} \quad (8)$$

where $$p_1+p_2+ \ldots p_k+ \ldots +p_n=j \quad (9)$$

$p_1$ being zero if the first term does not come into the product 8, and two if the first term comes twice in the product 8, and in general $p_k$ being capable of assuming a value within the range from 0 to $j$ inclusive. In the expansion the number of those products given by the expression 8 which have the exponents $p_1, p_2, \ldots, p_k, \ldots$, and $p_n$ equal to given values, respectively, is equal to the polynomial coefficient B, namely $$B_j=j!/(p_1!.p_2!. \ldots .p_k!. \ldots .p_n!) \quad (10)$$

so that the Equation 7 may formally be rewritten into $$\begin{aligned} y=&A_1.\sum_1 B_1.(2^{-1}e_1)^{p_1}.(2^{-2}e_2)^{p_2}. \ldots .(2^{-k}e_k)^{p_k} \ldots .(2^{-n}e_n)^{p_n} \\ &+A_2.\sum_1 B_2.(2^{-1}e_1)^{p_1}.(2^{-2}e_2)^{p_2}. \ldots (2^{-k}e_k)^{p_k}. \ldots .(2^{-n}e_n)^{p_n} \\ &+ \ldots \\ &+A_j.\sum_j B_j.(2^{-1}e_1)^{p_1}.(2^{-2}e_2)^{p_2}. \ldots (2^{-k}e_k)^{p_k}. \ldots .(2^{-n}e_n)^{p_n} \\ &+ \ldots \\ &+A_m.\sum_m B_m.(2^{-1}e_1)^{p_1}.(2^{-2}e_2)^{p_2}. \ldots (2^{-k}e_k)^{p_k}. \ldots .(2^{-n}e_n)^{p_n} \end{aligned}$$

where the summation with $j$ represents a sum of all the products given by the expression 8 with the respective coefficients given by the Equation 10 for all the values of $p_1, p_2, \ldots, p_k, \ldots$, and $p_n$ satisfying the Equation 9. The number of terms contained in the summation with the subscription $j$ is equal to $$\begin{aligned} {}_nH_j&={}_{n+j-1}C_j \\ &=(n+j-1)!/[(j!.(n-1)!] \end{aligned}$$

which is the number of combinations of $j$ things selected from among $n$ given distinct things with repetitions allowed. In effect, equations such as $$\begin{aligned} \sum_1=&e_1\times 2^{-1}+e_2\times 2^{-2}+e_3\times 2^{-3}+e_4\times 2^{-4}+ \ldots \\ &+e_{k-1}\times 2^{-k+1}+e_k\times 2^{-k}+e_{k+1}\times 2^{-k-1}+ \ldots +e_n\times 2^{-n} \end{aligned}$$

and $$\begin{aligned} \sum_2=&e_1^2\times 2^{-2}+2e_1e_2\times 2^{-3}+2e_1e_3\times 2^{-4}+2e_1e_4\times 2^{-5}+ \ldots \\ &+2e_1e_{k-1}\times 2^{-k}+2e_1e_k\times 2^{-k-1}+2e_1e_{k+1}\times 2^{-k-2}+ \ldots \\ &+2e_1e_n\times 2^{-n-1} \\ &+e_2^2\times 2^{-4}+2e_2e_3\times 2^{-5}+2e_2e_4\times 2^{-6}+ \ldots \\ &+2e_2e_{k-1}\times 2^{-k-1}+2e_2e_k\times 2^{-k-2}+2e_2e_{k+1}\times 2^{-k-3}+ \ldots \\ &+2e_2e_n\times 2^{-n-2} \\ &+e_3^2\times 2^{-6}+2e_3e_4\times 2^{-7}+ \ldots +2e_3e_{k-1}\times 2^{-k-2}+2e_3e_k\times 2^{-k-3} \\ &+2e_3e_{k+1}\times 2^{-k-4}+ \ldots +2e_3e_n\times 2^{-n-3} \\ &+e_4^2\times 2^{-8}+ \ldots +2e_4e_{k-1}\times 2^{-k-3}+2e_4e_k\times 2^{-k-4} \\ &+2e_4e_{k+1}\times 2^{-k-5}+ \ldots 2e_4e_n\times 2^{-n-4} \\ &+ \ldots \\ &+e_{k-1}^2\times 2^{-2k+2}+2e_{k-1}e_k\times 2^{-2k+1}+2e_{k-1}e_{k+1}\times 2^{-2k}+ \ldots \\ &+2e_{k-1}e_n\times 2^{-n-k+1} \\ &+e_k\times 2^{-2k}+2e_ke_{k+1}\times 2^{-2k-1}+ \ldots +2e_ke_n\times 2^{-n-k} \\ &+ \ldots \\ &+e_n^2\times 2^{-2n} \end{aligned}$$

result. Through separation of the powers of 2 (two) from the powers of $e_1, e_2, \ldots, e_k, \ldots$, and $e_n$, the Equation 11 turns into another formal equation:

$$\begin{aligned} y=&\sum_1 A_1.B_1.2^{-p_1-2p_2- \ldots -kp_k- \ldots -np_n}.e_1^{p_1}.e_2^{p_2}. \ldots .e_k^{p_k}. \ldots .e_n^{p_n} \\ &+\sum_2 A_2.B_2.2^{-p_1-2p_2- \ldots -kp_k \ldots np_n}.e_1^{p_1}.e_2^{p_2}. \ldots .e_k^{p_k}. \ldots .e_n^{p_n} \\ &+ \ldots \\ &+\sum_j A_j.B_j.2^{-p_1-2p_2- \ldots -kp_k- \ldots -np_n}.e_1^{p_1}.e_2^{p_2}. \ldots .e_k^{p_k}. \ldots .e_n^{p_n} \\ &+ \ldots \\ &+\sum_m A_m.B_m.2^{-p_1-2p_2- \ldots -kp_k- \ldots -np_n}.e_1^{p_1}.e_2^{p_2}. \ldots .e_k^{p_k}. \ldots .e_n^{p_n} \end{aligned} \quad (12)$$

For simplicity, such $j$ digits among the 1st through the $n$-th digits in that the exponents $p_1, p_2, \ldots, p_k, \ldots$, and $p_n$ of the product $e_1^{p_1}.e_2^{p_2}. \ldots .e_k^{p_k}. \ldots .e_n^{p_n}$ in the Equation 12 are not zero, will now be rewritten with suffices $$k_1, k_2, \ldots, k_q, \ldots, \text{and } k_j$$

and will be represented with a general suffix $k_q$. If a particular exponent $p_k$ is equal to $j$, then all suffices $k_q$ are the same. If each of the $j$ exponents among $p_1$ through $p_n$ is unity, then each combination of the suffices $k_q$ is each combination of $j$ suffices selected from among the $n$ suffices without repetitions. For example, when $j$ is 1, the symbol $k_1$ represents any one of 1, 2, . . . , $k$, . . . , and $n$; when $j$ is 2, the symbols $k_1$ and $k_2$ represent any one of combinations (1, 1), (1, 2), . . . , (1, $k$), . . . , (1, $n$); (2, 2), (2, 3), . . . , (2, $k$), . . . , (2, $n$); . . . ; ($k$, $k$), ($k$, $k$+1), . . . , ($k$, $n$); . . . ; ($n$, $n$). With such symbols $k_q$, the Equation 12 may further be rewritten as follows:

$$\begin{aligned} y=&\sum_1 A_1.B_1.2^{-k_1}.e_{k_1} \\ &+\sum_2 A_2.B_2.2^{-k_1-k_2}.e_{k_1}.e_{k_2} \\ &+ \ldots \\ &+\sum_j A_j.B_j.2^{-k_1-k_2- \ldots -k_q- \ldots -k_j}.e_{k_1}.e_{k_2}. \ldots e_{k_q}. \ldots e_{k_j} \\ &+ \ldots \\ &+\sum_m A_m.B_m.2^{-k_1-k_2- \ldots -k_q- \ldots -k_j- \ldots -k_m}\times e_{k_1}.e_{k_2}. \ldots .e_{k_q}. \ldots .e_{k_j}. \ldots .e_{k_m} \end{aligned} \quad (13)$$

Inasmuch as a binary code element or digit code $e_k$ in a codeword represents either 0 or 1, the products $e_1^{p_1}.e_2^{p_2}. \ldots .e_k^{p_k}. \ldots .e_n^{p_n}$ in the first, the second, and the other summations in the Equation 12 are, although formally different one from another, either 0 or 1. Thus, the products in the summation with a subscript $j$ are logical products formed among those $j$ digit codes selected from among the $n$ digit codes $e_1, e_2, \ldots, e_k, \ldots$, and $e_n$ with repetitions allowed, in which the exponents $p_1, p_2, \ldots, p_k, \ldots$, and $p_n$ representing the repetitions are not zero. Also, the products $e_{k_1}.e_{k_2}. \ldots .e_{k_q}. \ldots .e_{k_j}$ in the Equation 13 are logical products of $j$ digit codes $e_k$ and are either 0 or 1. It is, therefore, possible to provide a decoding circuit for producing a decoded output in accordance with an $m$-th degree function given by the Equation 3, by causing logical circuits to produce output powers representing products $e_{k_1}.e_{k_2}. \ldots .e_{k_q}. \ldots .e_{k_j}$ formed among $j$ digit codes $e_{k_1}, e_{k_2}, \ldots, e_{k_q}, \ldots$, and $e_{k_j}$ in each of all the combinations of such digit codes selected from the $n$ digit codes $e_1, e_2, \ldots, e_k, \ldots$, and $e_n$ with repetitions allowed, by multiplying the output powers by the respective coefficients in the Equation 13, or namely.

$$A_j.B_j.2^{-k_1-k_2- \ldots -k_q- \ldots -k_j} \quad (14)$$

and by summing up the multiplied products for all $j$ between 1 and $m$ inclusive. It is to be noted here that on obtaining a desired logical product it is not necessary to form a logical product among such digit codes that have come from a particular digit code into the $j$ digit codes in repetition (for example, the digit code ($e_1e_1e_2$), and it is sufficient that such a particular digit code is used only once. (For example, the digit ($e_1e_1e_2$) is equivalent to ($e_1e_2$).) Furthermore, it is preferable to provide standard power sources or coefficient circuits for producing voltages, currents, or other electric quantities proportional to the coefficients given by the Formula 14, respectively, and to sum up the electric quantities by themselves when the output electric quantities of the associated logical circuits are each unity and after modifying the electric quantities so that they may be zero when the output electric quantities of the logical ciruits are each zero.

It will be understood from the equations 3 and 4 that the coefficients $A_1, A_2, \ldots, A_j, \ldots,$ and $A_m$ are parameters having $m$-1 degree of freedom and that by optimum selection of such parameters it is possible to obtain a companding characteristic given by a desired $m$-th degree function. Inasmuch as even such a transcendental function as may not be given by a combination of simpler elementary functions, can be expanded according to the Taylor's expansion into a sum of powers of the variable, it is possible by selecting the coefficients $A_1, A_2, \ldots, A_j, \ldots,$ and $A_m$ in correspondence with the coefficients in the expanded formula to realize a decoding circuit having a companding characteristic given by the transcendental function.

While the principles of the invention have so far been described in conjunction with a decoding circut, it is possible by putting such a decoding circuit in the local decoding circuit of a feedback encoder to provide an encoder with a companding characteristic of an $m$-th degree function.

The following is the construction based upon the above principles for decoding a six-bit codeword $$\{e_1, e_2, e_3, e_4, e_5, e_6\}$$

composed of binary digit codes $e_1$, $e_2$ $e_3$, $e_4$, $e_5$, and $e_6$ into an analogue signal $y$ in accordance with a quadratic function.

In this particular case the equation 3 turns into $$y=A_1(i/N)+A_2(i/N)^2, \quad (15)$$

where $$A_1+A_2=1$$

may hold as has been explained in conjunction with the equation 4. Rewriting $A_2$ with A, $$y=(1-A)(i/N)+A(i/N)^2 \quad (16)$$

follows from the equation 15. Inasmuch as it follows from the equation 10 that each of $B_1$ and $B_2$ is unity when $k_1$ and $k_2$ are the same and is two when $k_1$ differs from $k_2$, $$y=\sum_{k=1}^{6}(1-A)\cdot 2^{-k}\cdot e_k + \sum_{k=1}^{6} A\cdot 2^{-2k}\cdot e_k + \sum_{k_1\neq k_2} A\cdot 2\cdot 2^{-k1-k2}\cdot e_{k1}\cdot e_{k2} \quad (17)$$

follows from the equation 13. Subscription $k_1\neq k_2$ of the summation means summing up of the summands for all $k_1$ and $k_2$ that are not equal to each other. Rewriting $k_1$ with $k$ and $k_2$ with $r$ with a view to simplifying the equation, the equation 17 turns into $$y=\sum_{k=1}^{6} W_k\cdot e_k + \sum_{k\neq r} W_{kr}\cdot e_k\cdot e_r \quad (18)$$

where $$W_k=(1-A)\cdot 2^{-k}+A\cdot 2^{-2k} = [2^k-(2^k-1)A]\cdot 2^{-2k}$$
$$W_{kr}=A\cdot 2^{-(k+r-1)} \quad (19)$$

from the second relation of which it will be apparent that the coefficients $W_{kr}$ in the equation 18 are equal to one another when the sum of the suffices $k$ and $r$ are equal to one another. The coefficients $W_k$ and $W_{kr}$ are given in Table 1 for suffices $k$ and $r$ which assume each a value ranging from 1 to 6 inclusive ($k$ is not equal to $r$) as will be clear from

TABLE 1

| Logical product of digit codes | Coefficient | |
|---|---|---|
| $e_1$ | $W_1$ | $(2-A)/2^2$ |
| $e_2$ | $W_2$ | $(4-3A)/2^4$ |
| $e_3$ | $W_3$ | $(8-7A)/2^6$ |
| $e_4$ | $W_4$ | $(16-15A)/2^8$ |
| $e_5$ | $W_5$ | $(32-31A)/2^{10}$ |
| $e_6$ | $W_5$ | $(64-63A)/2^{12}$ |
| $e_1e_2$ | $W_{12}$ | $A/2^2$ |
| $e_1e_3$ | $W_{13}$ | $A/2^3$ |
| $e_1e_4$ $e_2e_3$ | $W_{14}$ $W_{23}$ | $A/2^4$ |
| $e_1e_5$ $e_2e_4$ | $W_{15}$ $W_{24}$ | $A/2^5$ |
| $e_1e_6$ $e_2e_5$ $e_3e_4$ | $W_{16}$ $W_{25}$ $W_{34}$ | $A/2^6$ |
| $e_2e_6$ $e_3e_5$ | $W_{26}$ $W_{35}$ | $A/2^7$ |
| $e_3e_6$ $e_4e_5$ | $W_{36}$ $W_{45}$ | $A/2^8$ |
| $e_4e_6$ | $W_{46}$ | $A/2^9$ |
| $e_5e_6$ | $W_{56}$ | $A/2^{10}$ |

the equation 17. Incidentally, three coefficients such as $W_{16}$, $W_{25}$, and $W_{34}$ will become equal to one another when the sum of the suffices is between 3+3+1 and (6−3+1)+(6−3+1)−1 inclusive, or in the present case equal to 7, while two coefficients such as $W_{14}$ and $W_{23}$ will become equal to each other when the sum of suffices is between 2+2+1 and (6−2+1)+(6−2+1)−1 inclusive, or in the instant case between 5 and 9 inclusive, except the case wherein three coefficients become equal to one another. It is possible to further simplify the circuitry by once obtaining an algebraic sum of such logical products $e_ke_r$ whose coefficients are equal to one another and then by controlling with the algebraic sum the electric quantity produced by the associated standard power source. With this arrangement, only fifteen standard power sources are sufficient for a case wherein $m$ is two and $n$ is six. In general, $3(n-1)$ standard power sources are sufficient for a case in which $m$ is two. To add, the companding characteristic turns to $$y(i/N)^2$$

in case A is unity.

Now, the following is the construction of a decoding circuit for decoding a four-bit codeword ($e_1$, $e_2$, $e_3$, $e_4$) composed of binary digit codes $e_1$, $e_2$, $e_3$, and $e_4$ into an analogue signal $y$ according to a cubic function.

Inasmuch as a relation $$A_1+A_2+A_3=1 \quad (20)$$

follows from the equation 4, the equation 13 may be rewritten, by substituting $A_1$ with $1-A_2-A_3$, into $$\begin{aligned} y=&\sum_{k=1}^{4}(1-A_2-A_3)\cdot 2^{-k}\cdot e_k \\ &+\sum_{k=1}^{4} A_2\cdot\{2!/(2!.0!)\}\cdot 2^{-2k}\cdot e_k^2 \\ &+\sum_{k_1\neq k_2} A_2\cdot\{2!/(1!.1!)\}\cdot 2^{-k_1-k_2}\cdot e_{k_1}\cdot e_{k_2} \\ &+\sum_{k=1}^{4} A_3\cdot\{3!/(3!.0!.0!)\}\cdot 2^{-3k}\cdot e_k^3 \\ &+\sum_{k_1=k_2\neq k_3} A_3\cdot\{3!/(2!.1!.0!)\}\cdot 2^{-2k_2-k_3}\cdot e_{k_1}^2\cdot e_{k_3} \\ &+\sum_{k_1\neq k_2\neq k_3} A_3\cdot\{3!/(L!.1!.1!)\}\cdot 2^{-k_1-k_2-k_3}\cdot e_{k_1}\cdot e_{k_2}\cdot e_{k_3}\cdot \end{aligned} \quad (21)$$

By rewriting $k_1$ with $k$, $k_2$ with $r$, and $k_3$ with $s$, the equation 21 turns into $$y=\sum_{k=1}^{4} W_k\cdot e_k+\sum_{k\neq r} W_{rk}\cdot e_k\cdot e_r+\sum_{k\neq r\neq s} W_{krs}\cdot e_K e_r\cdot e_s \quad (22)$$

where $$\left.\begin{array}{r} W_{k}=\{1-A_2(1-2^{-k})-A_3(1-2^{-2k})\}\cdot 2^{-k} \\ W_{kr}=A_2\cdot 2^{-(k+r-1)}+A_3\cdot 3\cdot\{2^{-(k+r)}+2^{-(k+r)}\} \\ W_{krs}=A_3\cdot 6\cdot 2^{(k++r+s}, \end{array}\right\}(23)$$

from the second and the third relations of which it will be seen that the coefficients $W_{krs}$ in the equation 22 become to have the same values, when the sum of the suffices $k$, $r$, and $s$ have the same value. For all the values from 1 to 4 of the suffices $k$, $r$, and $s$, the coefficients $W_k$, $W_{kr}$, and $W_{krs}$ assume the values given in Table 2.

TABLE 2

| Logical product of digit codes | Coefficient | |
|---|---|---|
| $e_1$ $e_1e_1$ $e_1e_1e_1$ | $W_1$ | $(4-2A_2-3A_3)/2^3$ |
| $e_2$ $e_2e_2$ $e_2e_2e_2$ | $W_2$ | $(16-12A_2-15A_3)/2^6$ |
| $e_3$ $e_3e_3$ $e_3e_3e_3$ | $W_3$ | $(64-52A_2-63A_3)/2^9$ |
| $e_4$ $e_4e_4$ $e_4e_4e_4$ | $W_4$ | $(256-240A_2-255A_3)/2^{12}$ |
| $e_1e_2$ $e_1e_1e_2$ $e_1e_2e_2$ | $W_{12}$ | $(8A_2+9A_3)/2^5$ |
| $e_1e_3$ $e_1e_1e_3$ $e_1e_3e_3$ | $W_{13}$ | $(16A_2+15A_3)/2^7$ |
| $e_2e_3$ $e_2e_2e_3$ $e_2e_3e_3$ | $W_{23}$ | $(16A_2+9A_3)/2^8$ |
| $e_1e_4$ $e_1e_1e_4$ $e_1e_4e_4$ | $W_{14}$ | $(32A_2+27A_3)/2^9$ |
| $e_2e_4$ $e_2e_2e_4$ $e_2e_4e_4$ | $W_{24}$ | $(32A_2+15A_3)/2^{10}$ |
| $e_3e_4$ $e_3e_3e_4$ $e_3e_4e_4$ | $W_{34}$ | $(32A_2+9A_3)/2^{11}$ |
| $e_1e_2e_3$ | $W_{123}$ | $3A_3/2^5$ |
| $e_1e_2e_4$ | $W_{124}$ | $3A_3/2^6$ |
| $e_1e_3e_4$ | $W_{134}$ | $3A_3/2^7$ |
| $e_2e_3e_4$ | $W_{234}$ | $3A_3/2^8$ |

In general, $n(n+7)/2-8$ standard power sources are sufficient for companding an $n$-bit codeword according to a cubic function. If the coefficients in the equation 20 are such that some of the coefficients $W_k$, $W_{kr}$, and $W_{krs}$ in the equation 22 are equal to one another, the circuitry may further be simplified by once obtaining an algebraic sum of each combination of logical products for which the coefficients become equal to one anothei and then by controlling with such algebraic sums the associated standard power sources. Incidentally, it will be understood that if the coefficient $A_3$ in the equation 20 is zero, the decoding circuit performs decoding according to a quadratic function, that if both $A_2$ and $A_3$ are zero, the decoding circuit serves for decoding in accordance with a linear function or linear decoding, and that if $A_3$ is unity or namely $A_1$ and $A_2$ are both zero, the decoding circuit decodes in compliance with a companding characteristic given by $$y=(i/N)^3$$

Now the invention will be explained with reference to the accompanying drawings, in which.

Figures 1, 2:
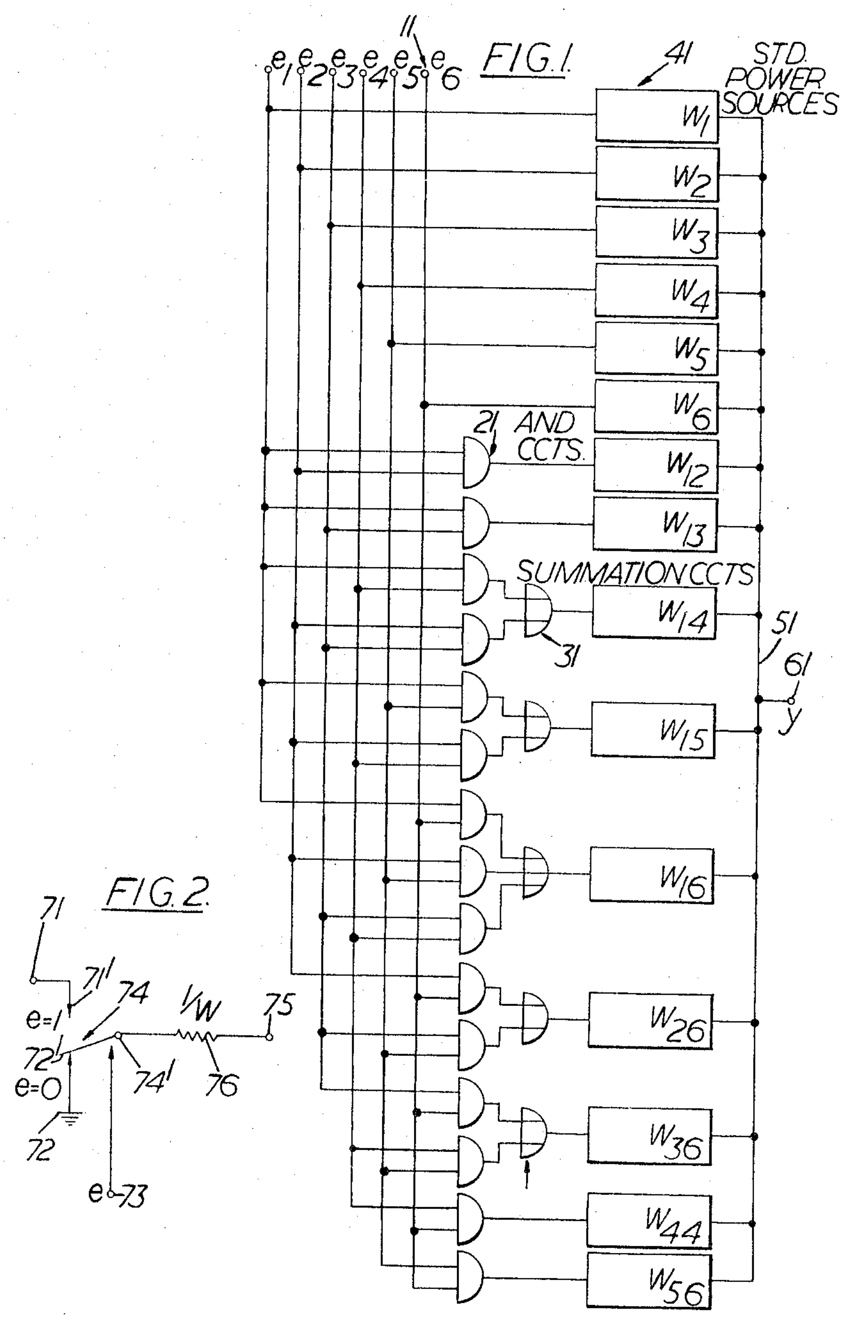
FIG. 1 is a block diagram of an embodiment of the invention.
FIG. 2 is a circuit diagram of a standard power source for use in a decoding circuit of the invention.

Referring at first to FIG. 1, a decoding circuit for decoding a six-bit codeword $\{e_1, e_2, e_3, e_4, e_5, e_6\}$ composed of binary digit codes into an analogue signal $y$ companded according to a given quadratic function comprises six input terminals 11 for receiving the digit codes $e_1$, $e_2$, $e_3$, $e_4$, $e_5$, and $e_6$, respectively; two-input AND circuits 21, $(6^2-6)\div 2=15$ in number, for producing logical products between the respective combinations of two different digit codes $e_k$ and $e_r$ (where each of $k$ and $r$ represents an integer between one and six inclusive and $k$ and $r$ are not equal to each other) among the six digit codes; two-input and three-input algebraic summation circuits 31 for producing algebraic sums of such two and three logical products, respectively, among the logical products $e_ke_r$ of the two digit codes in that the arithmetic sum of the suffices $k$ and $r$ become equal to each other and one another, respectively; standard power sources 41 for generating electric quantities $W_1$, $W_2$, $W_3$, $W_4$, $W_5$, $W_6$, $W_{12}$, $W_{13}$, $W_{14}$, $W_{15}$, $W_{16}$, $W_{26}$, $W_{36}$, $W_{46}$, and $W_{56}$ in accordance with the digit codes $e_1$, $e_2$, $e_3$, $e_4$, $e_5$, and $e_6$, the logical products $e_1e_2$ and $e_1e_3$, the algebraic sum of the logical products $e_1e_4$ and $e_2e_3$, the algebraic sum of the logical products $e_1e_5$ and $e_2e_4$, the algebraic sum of the logical products $e_1e_6$, $e_2e_5$, and $e_3e_4$, the algebraic sum of the logical products $e_2e_6$ and $e_3e_5$, the algebraic sum of the logical products $e_3e_6$ and $e_4e_5$, and the logical products $e_4e_6$ and $e_5e_6$ and with the law given by the equation 19 or by the Table 1, respectively; connections 51 for combining the electric quantities generated by the standard power sources 41 into the decoded output power $y$; and an output terminal 61 for deriving the decoded output power $y$. The operation of the decoding circuit will be evident from the above-mentioned principles of the invention.

Referring next to FIG. 2, one of the standard power sources 41 for generating an electric quantity according to the predetermined law given by the equation 19 and with reference to the digit code $e_1$ or the like, the logical product $e_1e_2$ or the like, or the algebraic sum of the logical products $e_1e_4$ and $e_2e_3$ or the like comprises a power terminal 71 incessantly supplied with a unit voltage E; a switching member 74 having a contact 71' connected to the power terminal 71 and another contact 72' connected to a point 72 of potential reference such as the earth and adapted to connect a third contact 74' with either of the contacts 71' and 72' according to the value of the digit code or the logical product or the algebraic sum supplied as a control input to a control input terminal 73; and a resistor 76 interposed between the third contact 74' and an output terminal 75. The resistance of the resistor 76 is so determined as to be equal to $1/W_k$, with the result that the electric current obtained at the output terminal 75 is equal to $EW_k$ when the control input $e_k$ is unity and equal to 0 when the control input $e_k$ is zero and consequently equal to $W_ke_k$. Similarly, an electric current $W_{kr}e_ke_r$ may be obtained at the output terminal 75 even though the control input may be the logical product or sum $e_ke_r$.

Figures 3, 4:
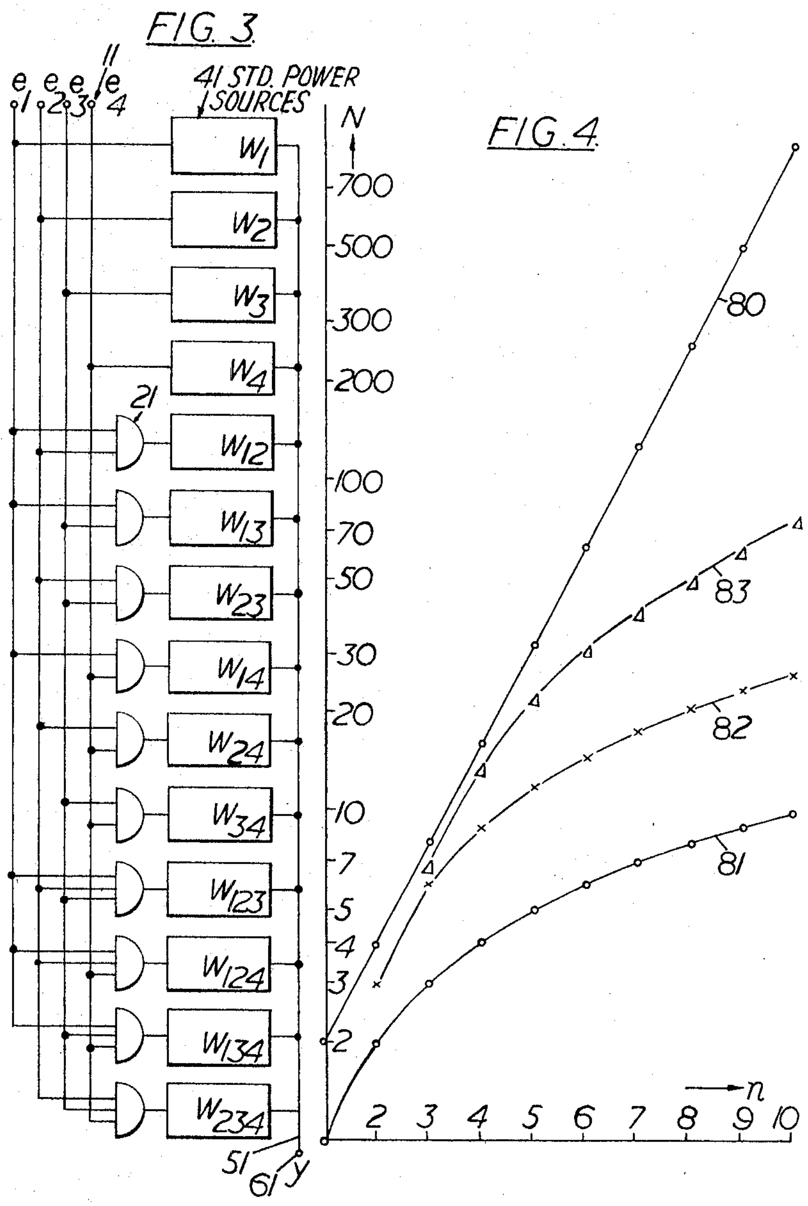
FIG. 3 is a block diagram of another embodiment of the invention.
FIG. 4 is a graph for explaining the technical merits of the invention.

Referring to FIG. 3, another embodiment of the invention shown therein is so composed as to decode a four-bit codeword in compliance with a companding characteristic of a given cubic function. The construction of this embodiment shown in FIG. 3 will be apparent from the first-mentioned embodiment illustrated in FIG. 2, while the operation thereof will be evident from the explanation of the principles of this invention.

Finally referring to FIG. 4 wherein the abscissa shows the number $n$ of bits composing a codeword and the ordinate shows in a logarithmic scale the number N of the standard power sources, decoding for $n$ bits according to an optional characteristic requires as has been mentioned $2^n$ standard power sources as is illustrated by a straight line 80, whereas with the invention the number of the standard power sources required for linear decoding, decoding in accordance with a quadratic function, and that in compliance with a cubic function are as small as are plotted curves 81, 82, and 83, respectively. It is admitted that decoding in compliance with a higher $m$-th order polynomial is generally complicated in comparison with a linear decoding. It will, however, be appreciated that decoding according to even a high $m$-th degree function is much simplified as compared with that according to optional characteristics, particularly for greater bit number $n$.

While the invention has so far been explained, it is to be noted that the patent right allowed to the application covers any decoding circuits and decoders which fall within the scope of the following claims for patent and any encoders which comprises such decoding circuits.

What is claimed is:

1. A device for conversion between an analogue signal and a digital signal with non-linear quantization comprising a plurality of input terminals for receiving digit codes composing a codeword, respectively; logical operation circuits connected to said input terminals for performing logical operation for each predetermined combination of at least one of said digit codes to produce logical output codes; a plurality of standard power sources connected to said input terminals and said logical operation circuits, and respectively controlled by said digit codes and said logical output codes to respectively generate electric quantities in response thereto, and in accordance with a predetermined law; and means connected to said standard power sources to combine said electric quantities to deliver the desired decoded output.

2. A decoder for converting a binary codeword having $n$ digits $e_1, e_2 \ldots e_n$ to an analogue signal with a companding characteristic of an $m$-th order polynomial, comprising, a plurality of input terminals equal in number to the number of code digits, $n$, logic circuits connected to said terminals for combining the input signal digits applied to said terminals into logical products of predetermined code combinations represented by, $e_1e_2, e_1e_3 \ldots e_2, e_3 \ldots e_1e_2e_3, e_1e_2e_4 \ldots$, a plurality of power sources for producing two output electrical quantities, one quantity being of a magnitude equal for all said sources and the other quantities varying in accordance with said $m$-th order polynomial, means for applying the said digit codes and said logical output codes to appropriate of said power sources for causing selective outputs of one of said electrical quantities, and means coupled to the outputs of said power sources for summing up said electrical quantities.

3. A decoder according to claim 2 wherein $m$ is two and the number of said power sources is $3(n-1)$.

4. A decoder according to claim 2 wherein $m$ is a cubic function and the number of said power sources is $n(n+7)/2-8$.

References Cited by the Examiner

UNITED STATES PATENTS

| | | | |
|---|---|---|---|
| 3,201,778 | 8/1965 | Porter et al. | 340—347 |

MAYNARD R. WILBUR, *Primary Examiner.*

A. L. NEWMAN, *Assistant Examiner.*